US009675007B2

(12) United States Patent
Schrattenecker

(10) Patent No.: US 9,675,007 B2
(45) Date of Patent: Jun. 13, 2017

(54) HARVESTING ATTACHMENT FOR A HARVESTER

(71) Applicants: CNH Industrial Belgium nv, Zedelgem (BE); Biso Schrattenecker GmbH, Ort im Innkreis (AT)

(72) Inventor: Franz Schrattenecker, Eggerding (AT)

(73) Assignee: CNH Industrial Belgium nv, Zedelgem (BE)

( * ) Notice: Subject to any disclaimer, the term of this patent is extended or adjusted under 35 U.S.C. 154(b) by 0 days.

(21) Appl. No.: 14/408,138

(22) PCT Filed: Jun. 11, 2013

(86) PCT No.: PCT/EP2013/001710
§ 371 (c)(1),
(2) Date: Dec. 15, 2014

(87) PCT Pub. No.: WO2013/185908
PCT Pub. Date: Dec. 19, 2013

(65) Prior Publication Data
US 2015/0164001 A1    Jun. 18, 2015

(30) Foreign Application Priority Data
Jun. 15, 2012    (DE) .................. 10 2012 011 912

(51) Int. Cl.
*A01D 41/14*    (2006.01)
*A01D 75/00*    (2006.01)
*A01D 45/00*    (2006.01)
*A01D 45/02*    (2006.01)

(52) U.S. Cl.
CPC ........... *A01D 75/008* (2013.01); *A01D 41/14* (2013.01); *A01D 45/00* (2013.01); *A01D 45/021* (2013.01)

(58) Field of Classification Search
CPC ...... A01D 41/14; A01D 45/02; A01D 45/021; A01B 23/04; A01B 73/00
USPC ......................................... 56/15.8, 158, 159
See application file for complete search history.

(56) References Cited

U.S. PATENT DOCUMENTS

| | | | | |
|---|---|---|---|---|
| 2,585,208 | A | * | 2/1952 | Abel .................... A01D 45/028 56/15.1 |
| 3,456,829 | A | * | 7/1969 | Glassmeyer ......... B65D 88/121 220/1.5 |
| 3,971,446 | A | * | 7/1976 | Nienberg ............. A01B 51/026 111/158 |
| 4,000,600 | A | * | 1/1977 | Butler .................. A01D 41/141 56/220 |
| 4,011,709 | A | | 3/1977 | Mott et al. |
| 4,372,492 | A | * | 2/1983 | Blumenshine ...... A01M 7/0075 239/168 |
| 4,407,110 | A | | 10/1983 | McIlwain et al. |
| 5,129,216 | A | | 7/1992 | Gullickson |

(Continued)

FOREIGN PATENT DOCUMENTS

CN    2247412 Y    2/1997
DE    102010052816 A1    5/2012

*Primary Examiner* — John G Weiss
(74) *Attorney, Agent, or Firm* — Peter K. Zacharias; Patrick M. Sheldrake

(57) ABSTRACT

A harvesting attachment for a harvester comprising a frame that has a rear wall and a bottom wall. To improve a harvesting attachment of this type, the rear wall comprises a central portion and two outer portions. The central portion of the rear wall is made of a high-tensile material.

20 Claims, 18 Drawing Sheets

(56) References Cited

U.S. PATENT DOCUMENTS

Figure 1:
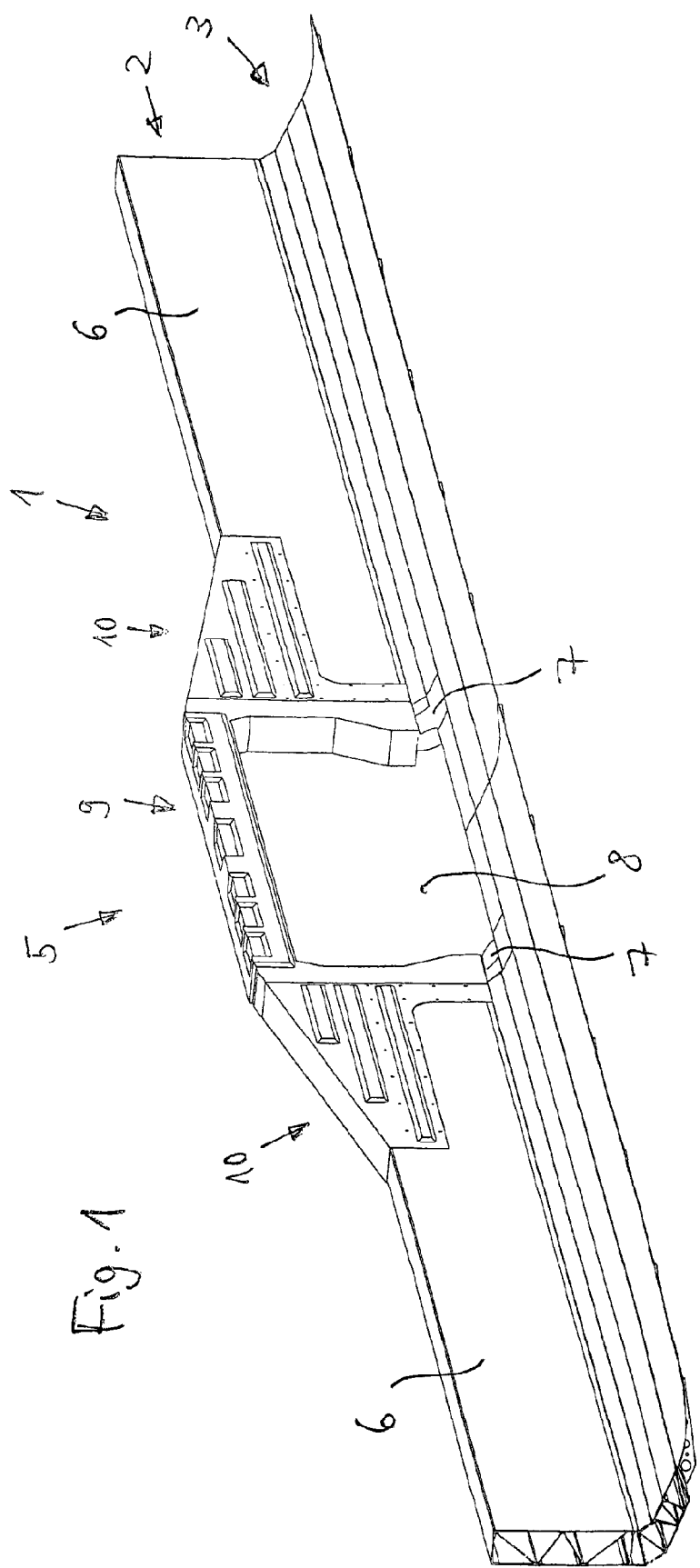

| | | | |
|---|---|---|---|
| 6,901,730 B1 * | 6/2005 | Buresch | A01D 63/04 56/314 |
| 7,155,872 B2 * | 1/2007 | Francom | E04C 3/08 52/648.1 |
| 7,520,117 B2 | 4/2009 | Rieck et al. | |
| 7,614,206 B2 * | 11/2009 | Tippery | A01D 41/144 56/15.8 |
| 7,877,976 B2 | 2/2011 | Honas et al. | |
| 8,756,904 B2 | 6/2014 | Schrattenecker | |
| 8,776,487 B2 | 7/2014 | Coers et al. | |

* cited by examiner

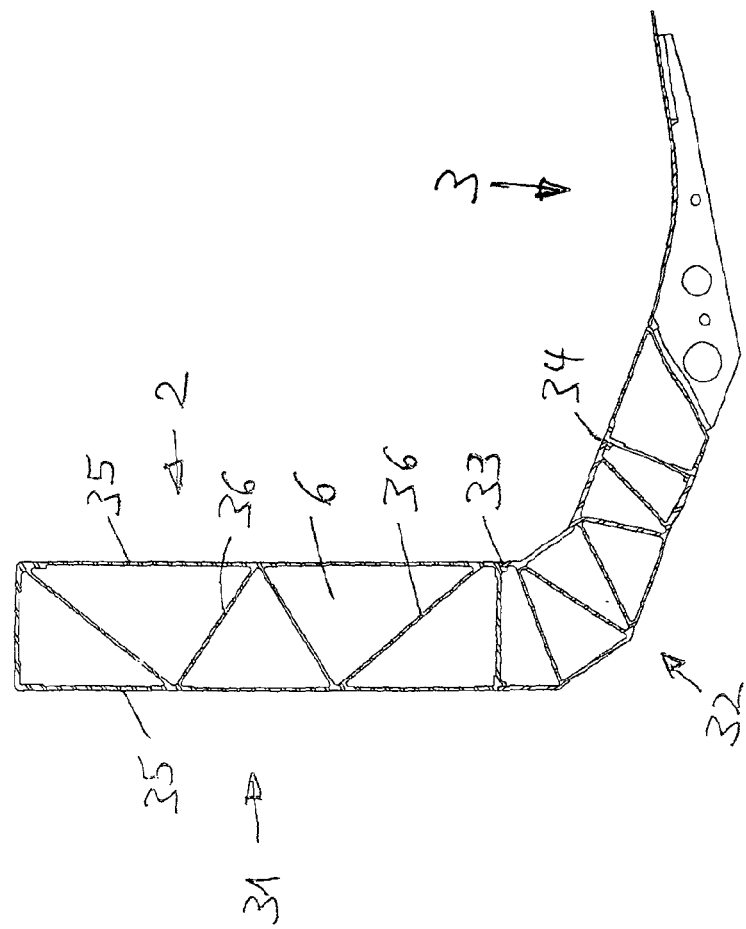
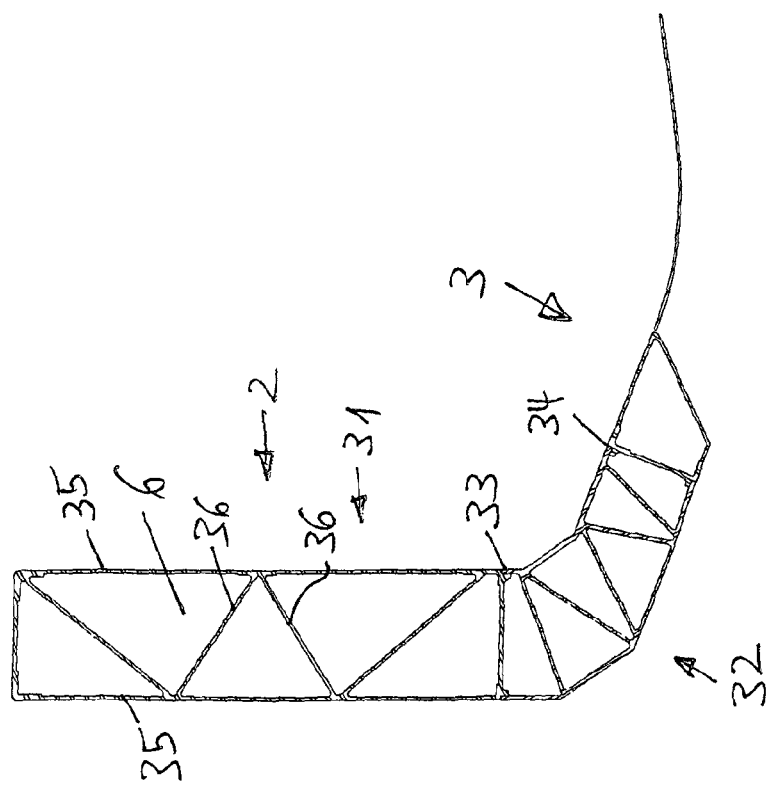
Fig. 3

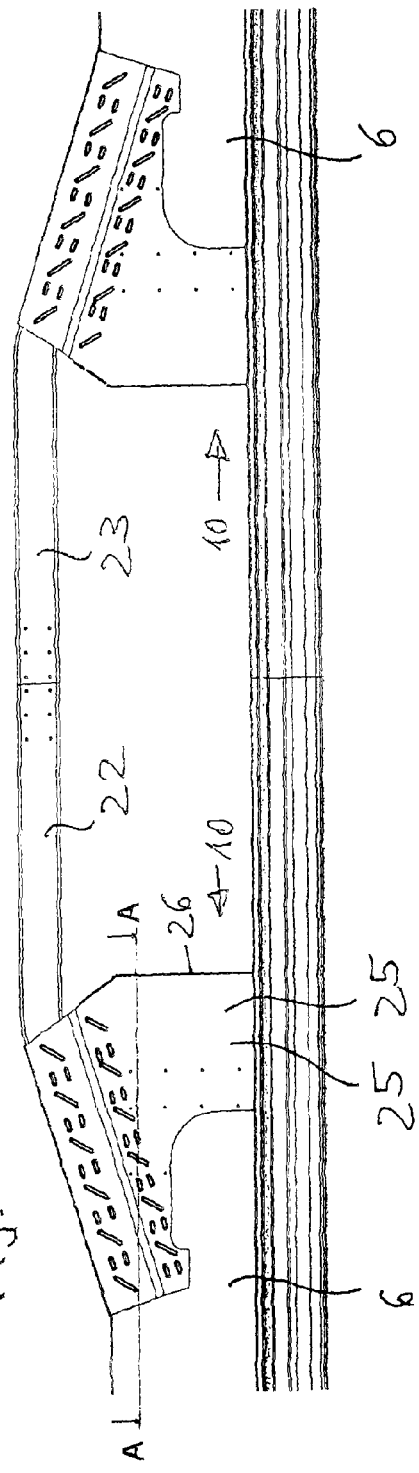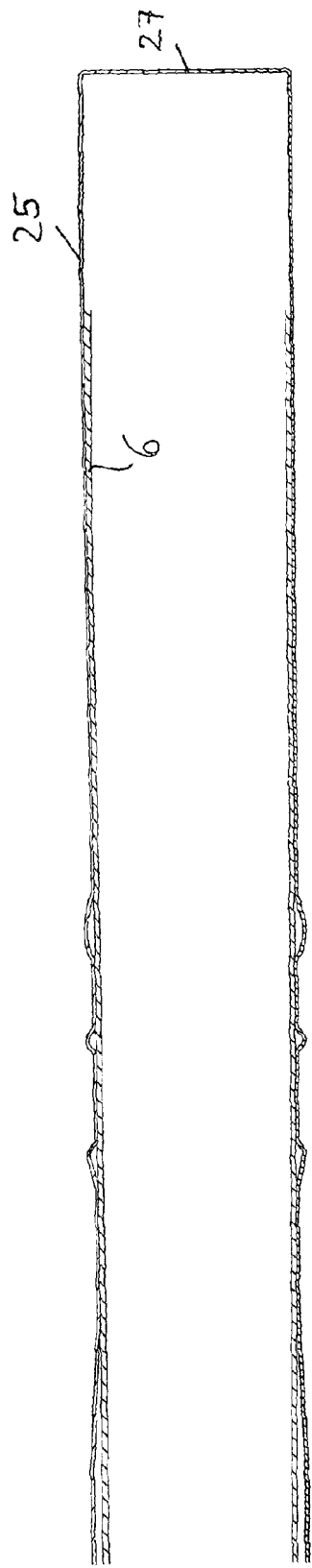
Fig. 14
Schnitt A-A

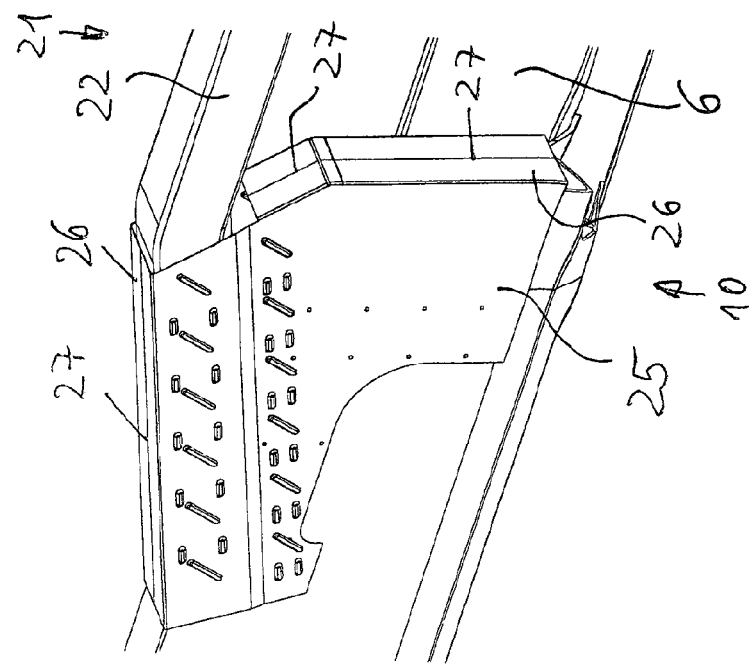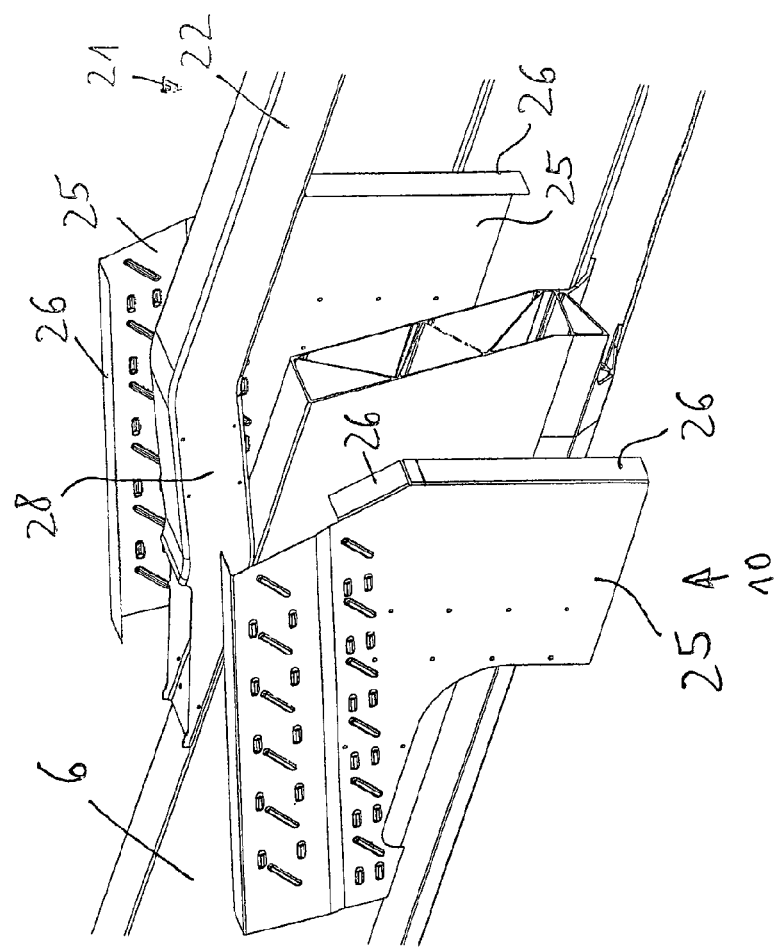

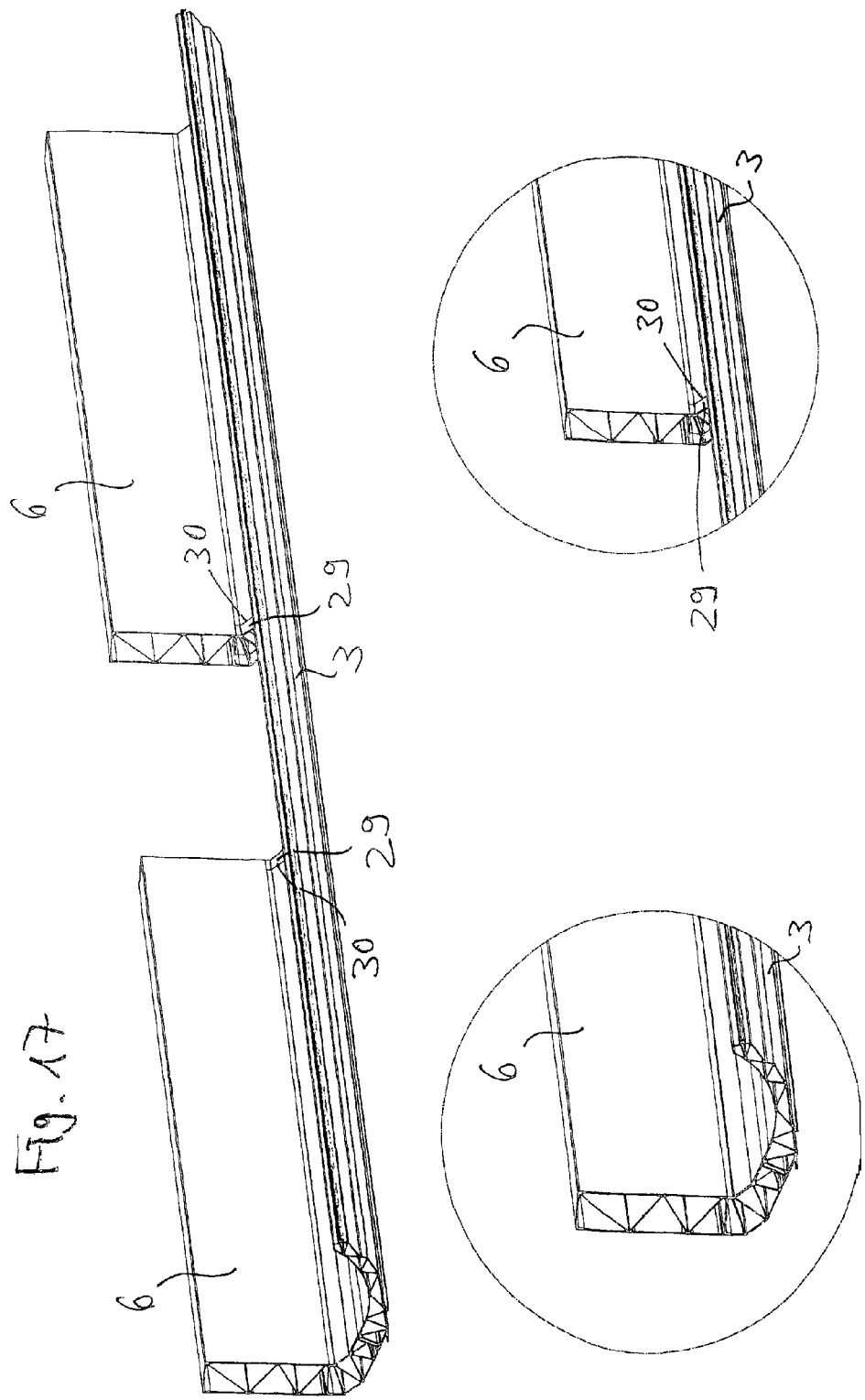

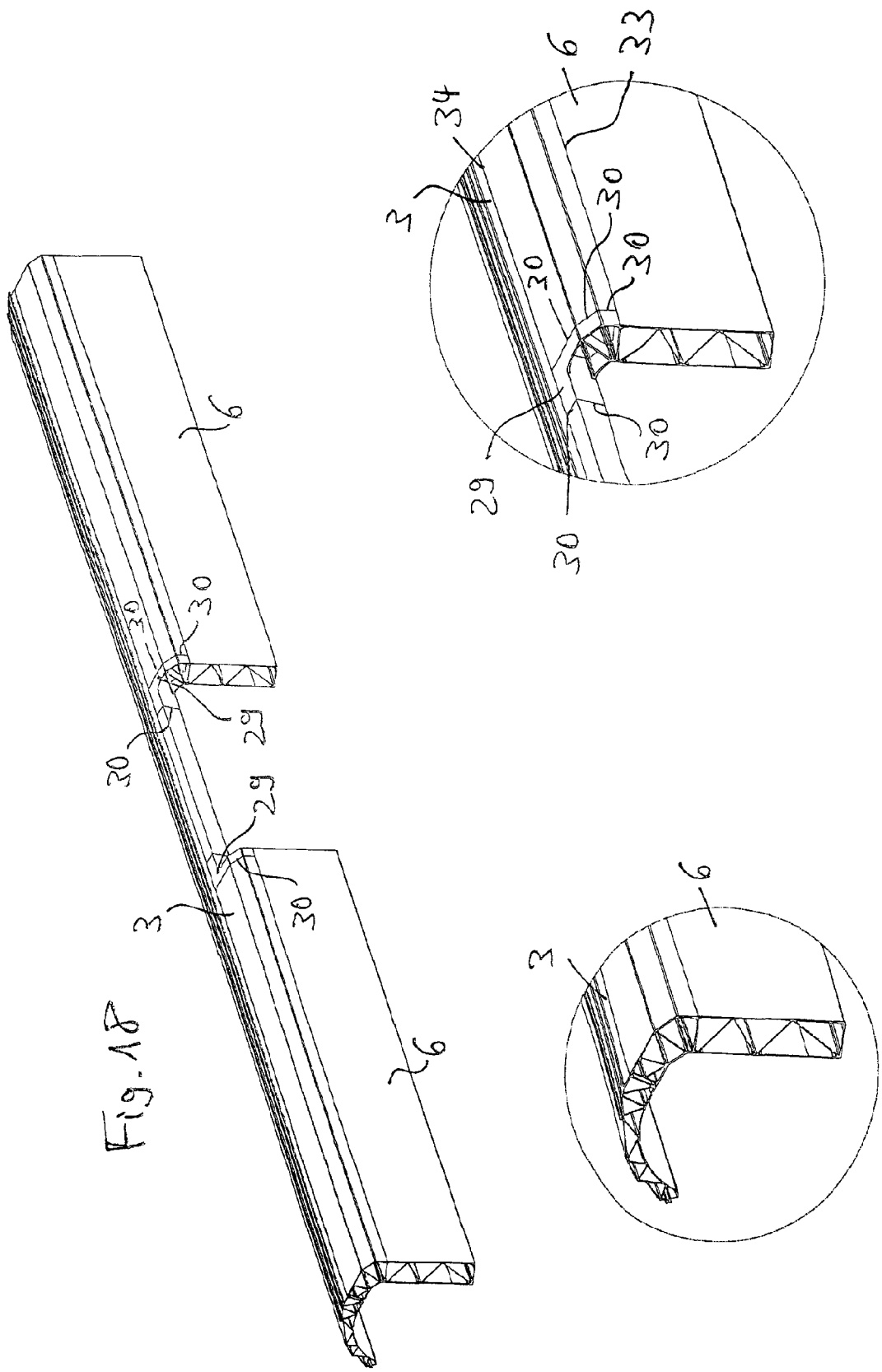

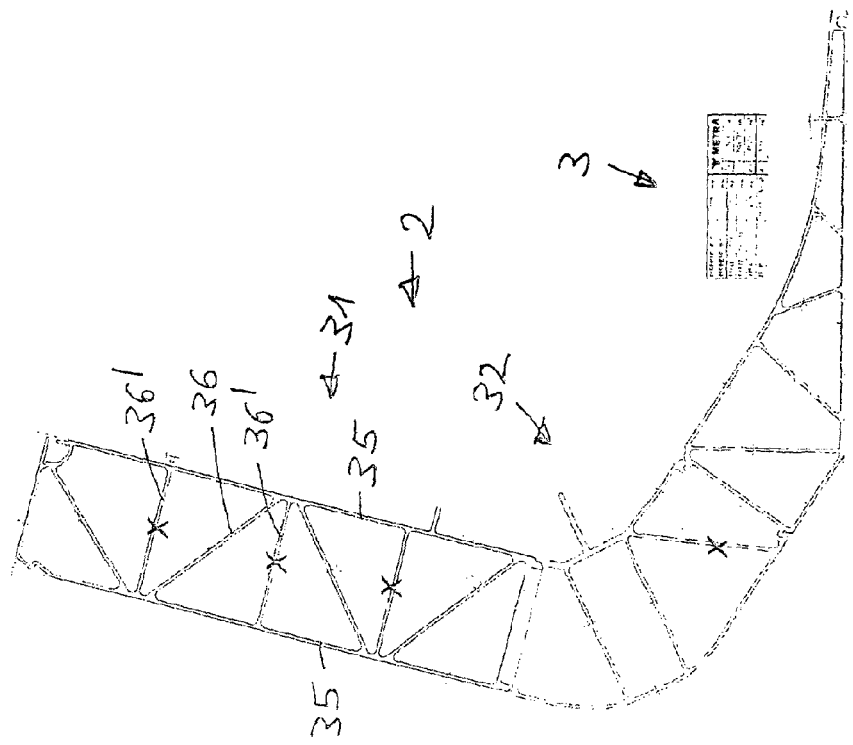
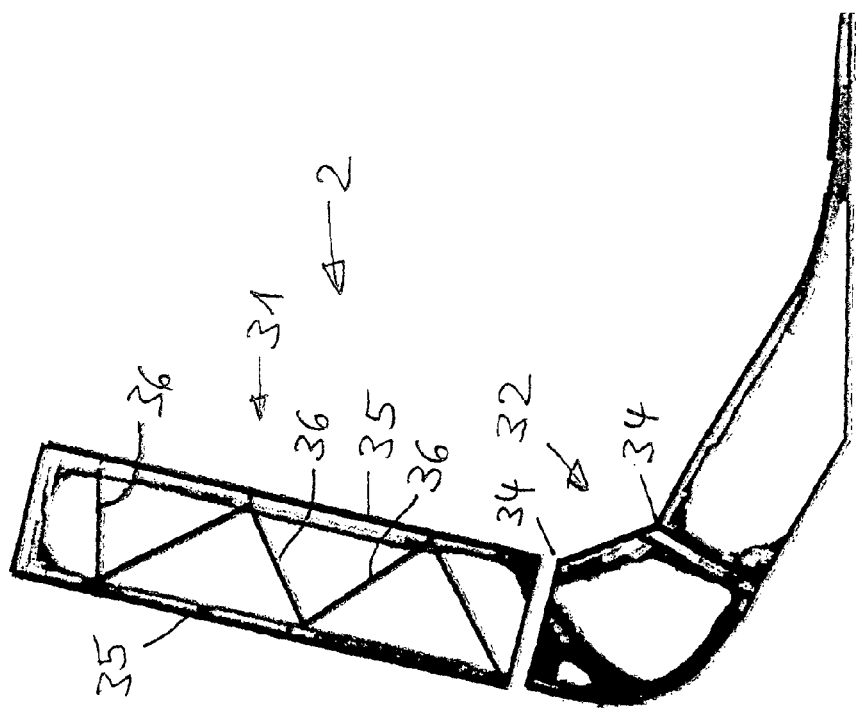

HARVESTING ATTACHMENT FOR A HARVESTER

This application is the US National Stage filing of International Application Ser. No. PCT/EP2013/001710 filed on Jun. 11, 2013 which claims priority to German Application DE 10.2012.011.912.7 filed Jun. 15, 2012, each of which is incorporated herein by reference in its entirety.

The invention relates to a harvesting attachment for a harvester having a frame which includes a rear wall and a bottom wall.

Such a harvesting attachment is known from DE 10 2010 052 816 A1. The harvesting attachment can furthermore have one or two side walls at its ends. The frame of the harvesting attachment can serve the purpose of receiving different harvesting tools, in particular of receiving a cutting unit. The harvesting attachment can be attached to a harvester, in particular a combine harvester. It is moved in a forward direction over a field by means of an agricultural harvester during the harvesting operation and serves to receive specific crops. The harvesting attachment, for example, may comprise a cutting unit, a reel, a cutting bar, crop dividers and/or side cutters and/or further required components. The harvesting attachment is preferably mountable or mounted to the front of a harvester, in particular of a combine harvester. It can comprise a corn header, such as in particular used in a corn harvester.

It is the object of the invention to provide an improved harvesting attachment of the initially named type.

This object is achieved in accordance with the invention by the features of claim 1.

The rear wall comprises a central portion and two outer portions. The central portion of the rear wall is made of a high-tensile material. It is advantageous if the central portion of the rear wall is made of steel, preferably high-tensile steel. A further advantageous improved development is characterized in that the outer portions of the rear wall and/or the bottom wall take the form of an extrusion (continuous cast) profile, preferably as a light-metal extrusion profile, in particular made of aluminum and a material that contains aluminum.

The invention provides a harvesting attachment that is made of a high-tensile material, in particular steel, as well as a material with lower strength, in particular aluminum. A high-tensile material is used in the particularly highly stressed parts of the harvesting attachment. The weight of the harvesting attachment can be reduced hereby and/or the length of the harvesting attachment can be increased. The manufacturing costs of the harvesting attachment can furthermore be reduced.

Additional advantageous further developments are described in the dependent claims.

It is advantageous if the central portion comprises a top part and two side parts that are connected to one another. The top part and the two side parts are initially produced separately and then connected to one another. They delimit, together with the bottom wall, a passage opening that can serve to mount the frame to the harvesting vehicle.

The central portion can comprise two lower parts that are each connected to one outer portion. The lower parts can each be connected to one side part, preferably in the lower area of the side part, and/or with the top part, in particular with downwardly pointing extensions of the top part.

According to a further advantageous development the top part and/or the side parts and/or the lower parts are welded together and/or bolted together.

A preferred embodiment is characterized in that the top part is formed as a hydroformed component and that the side parts are formed as bent and stamped components.

It is advantageous if the lower parts are formed as bent and stamped or cast components.

The top part can feature downwardly pointing extensions, which are welded to the side parts. The downwardly pointing extensions are preferably formed as bent and stamped components.

A further advantageous embodiment is characterized in that the top part is formed as a bent tube, preferably a square tube, and that the side parts are formed as bent and stamped components.

It is advantageous if the top part is composed of two parts that are connected to one another by means of angle parts. The angle parts are preferably formed as bent and stamped components.

It is advantageous if the side parts each comprise two side plates that are welded together.

The side parts can be bolted together with the outer portions.

It is advantageous if the bottom wall and the outer portions are connected, preferably welded together, with a corner reinforcement in the area of their lower interior ends. The corner reinforcement is preferably a corner reinforcement profile.

A further advantageous improved development is characterized in that the outer portions feature an extrusion profile rear wall whose outer walls are connected to one another by means of bracing walls which extend obliquely to the outer walls. Bracing walls which are perpendicular to the outer walls are not present. Thus this embodiment is different from the extrusion profile rear wall according to DE 10 2010 052 816 A1.

Embodiments of the invention are explained in detail below with reference to the accompanying drawing. There are shown in FIG. 1, a harvesting attachment in a perspective view from the front, FIG. 2, the, in the driving direction of the harvester, left side of the harvesting attachment according to FIG. 1, in a view from the front and in a view from above, FIG. 3, a section along the line A-A in FIG. 2, FIG. 4, a further harvesting attachment in a perspective view from the front, FIG. 5, the, in the driving direction of the harvester, left side of the harvesting attachment according to FIG. 4 in a view from the front and in a view from above, FIG. 6, a section along the line A-A in FIG. 5, FIG. 7, a first embodiment of a central portion of a rear wall of a harvesting attachment in the assembled state in a perspective view.

Figure 7:
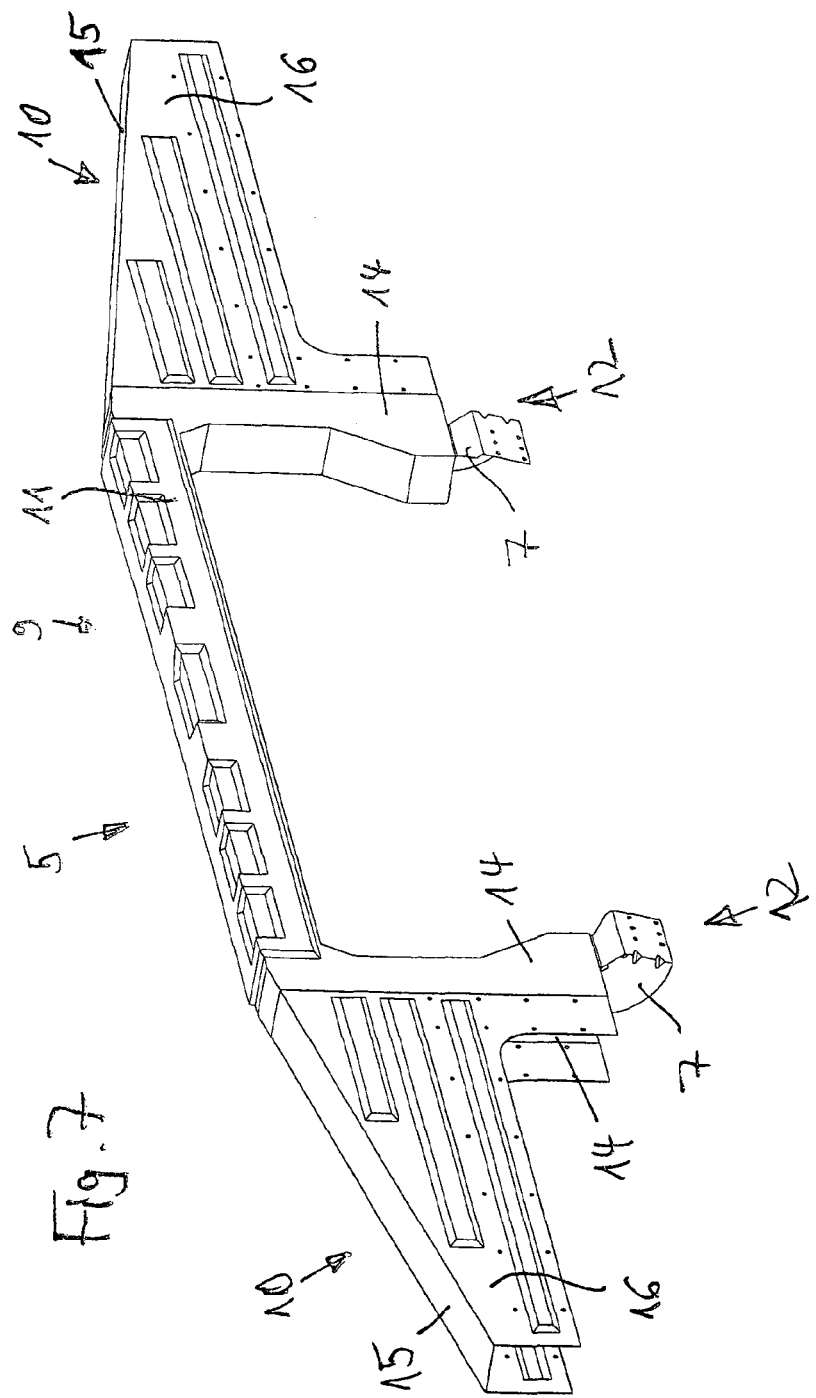
Figure 8:
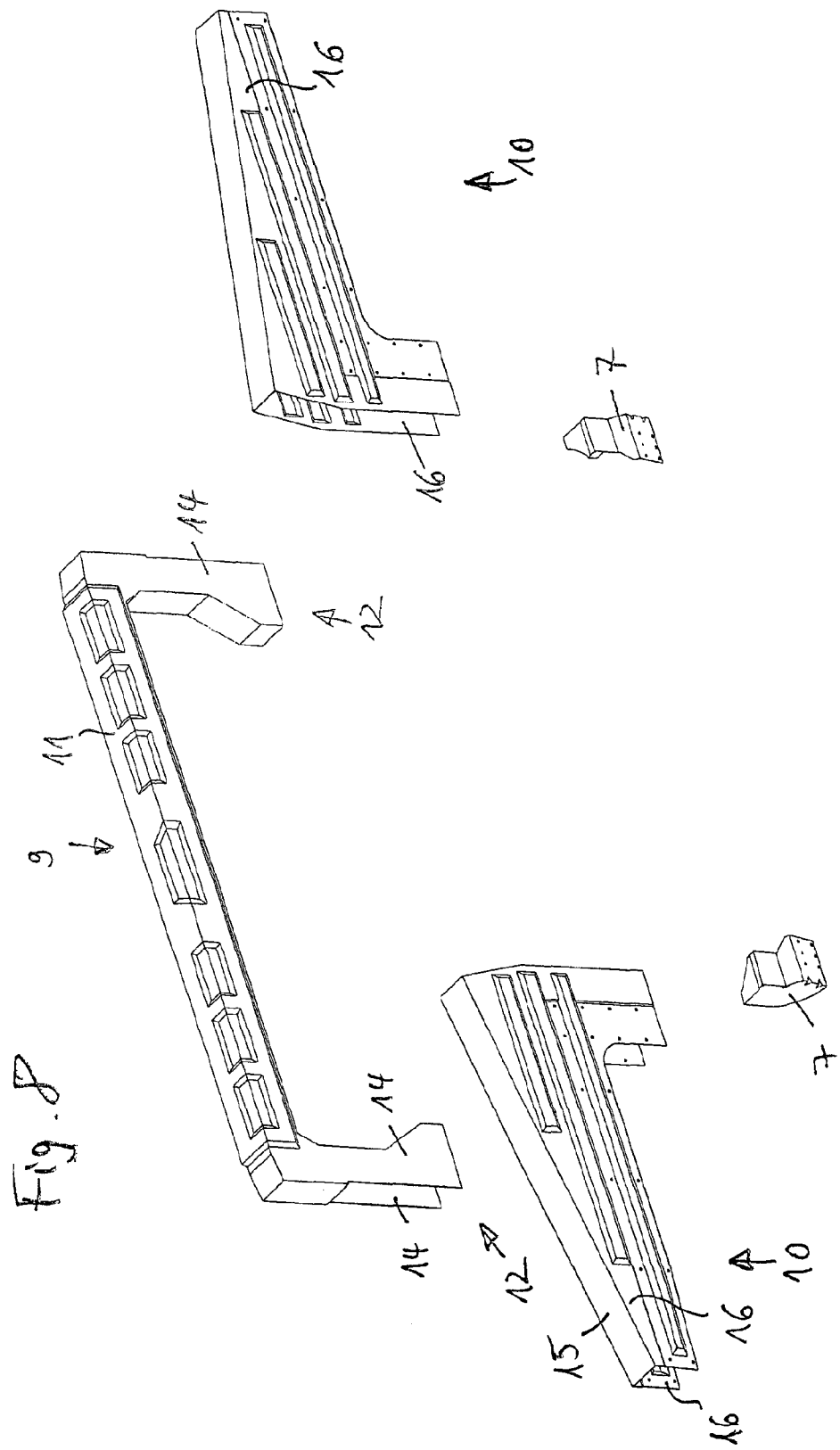
Figure 9:
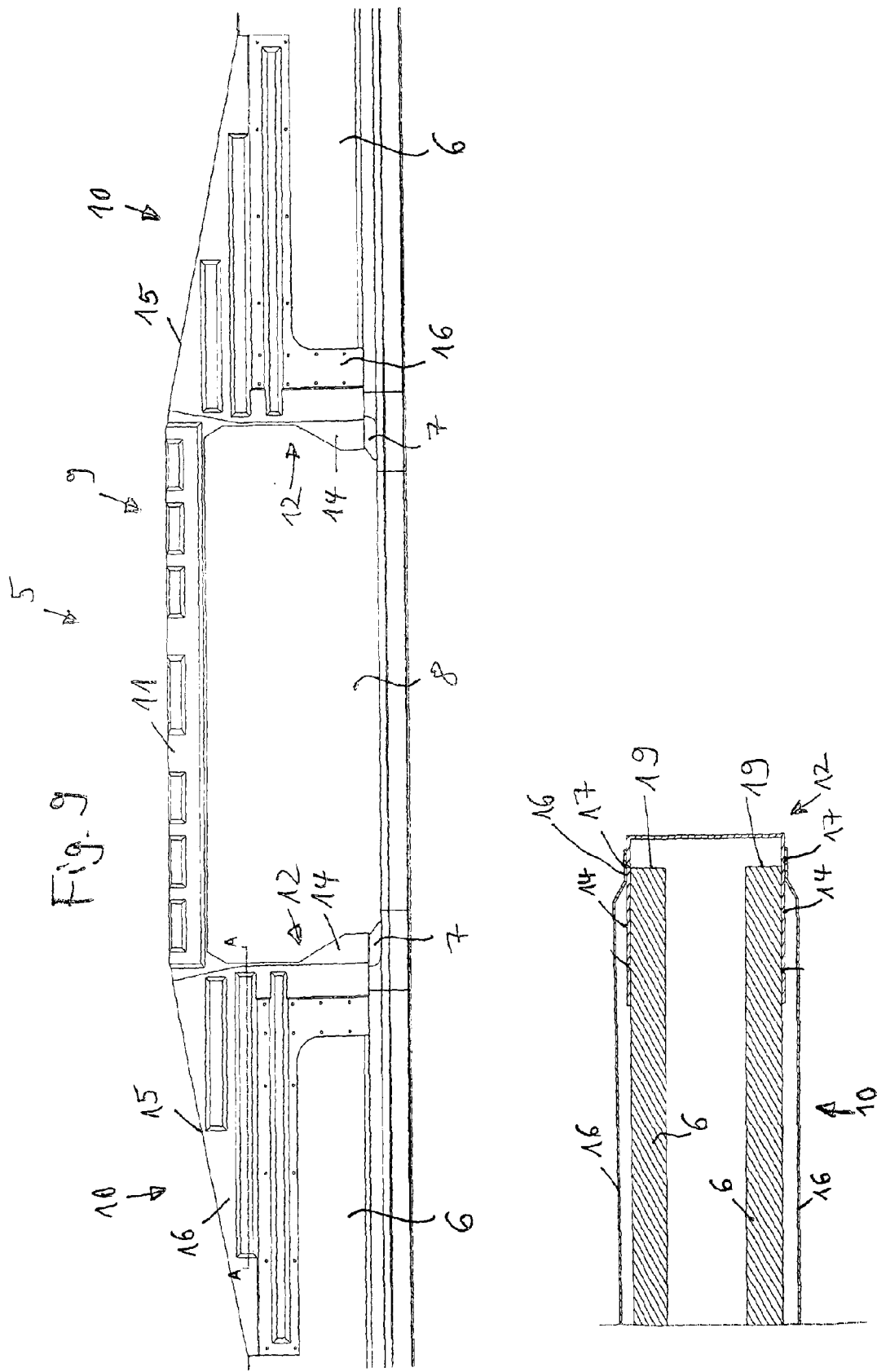
Figure 10:
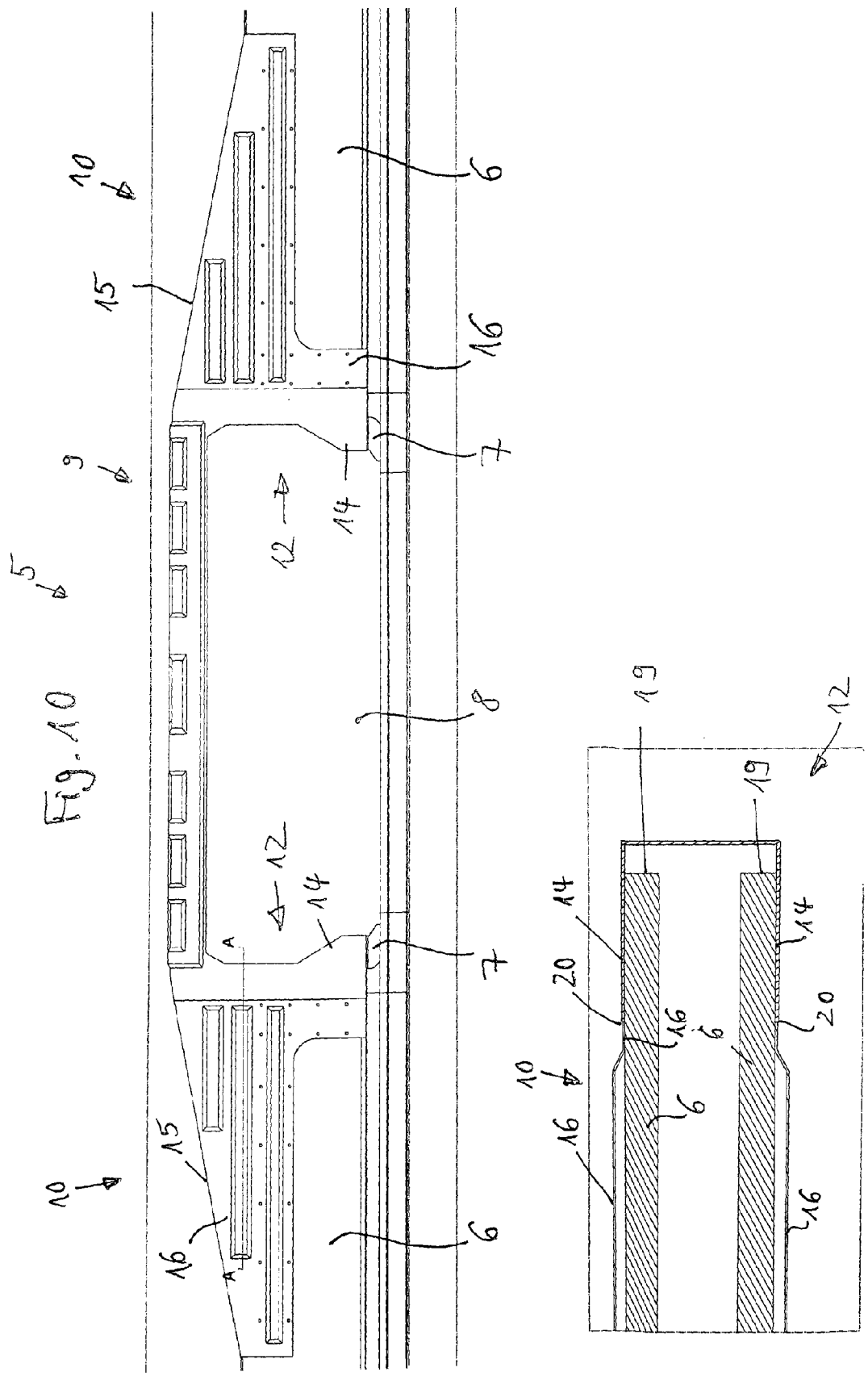
Figure 11:
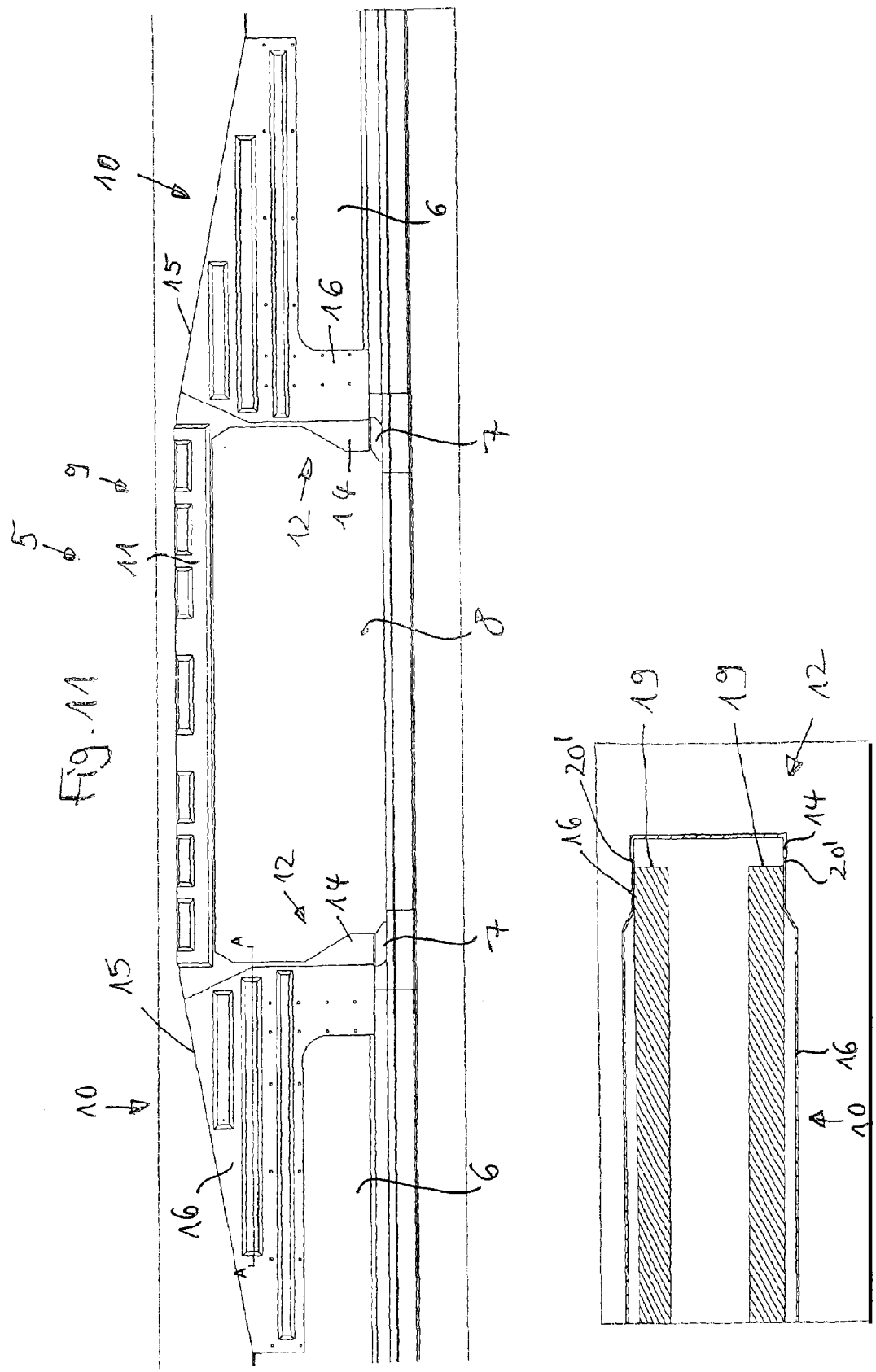
Figure 12:
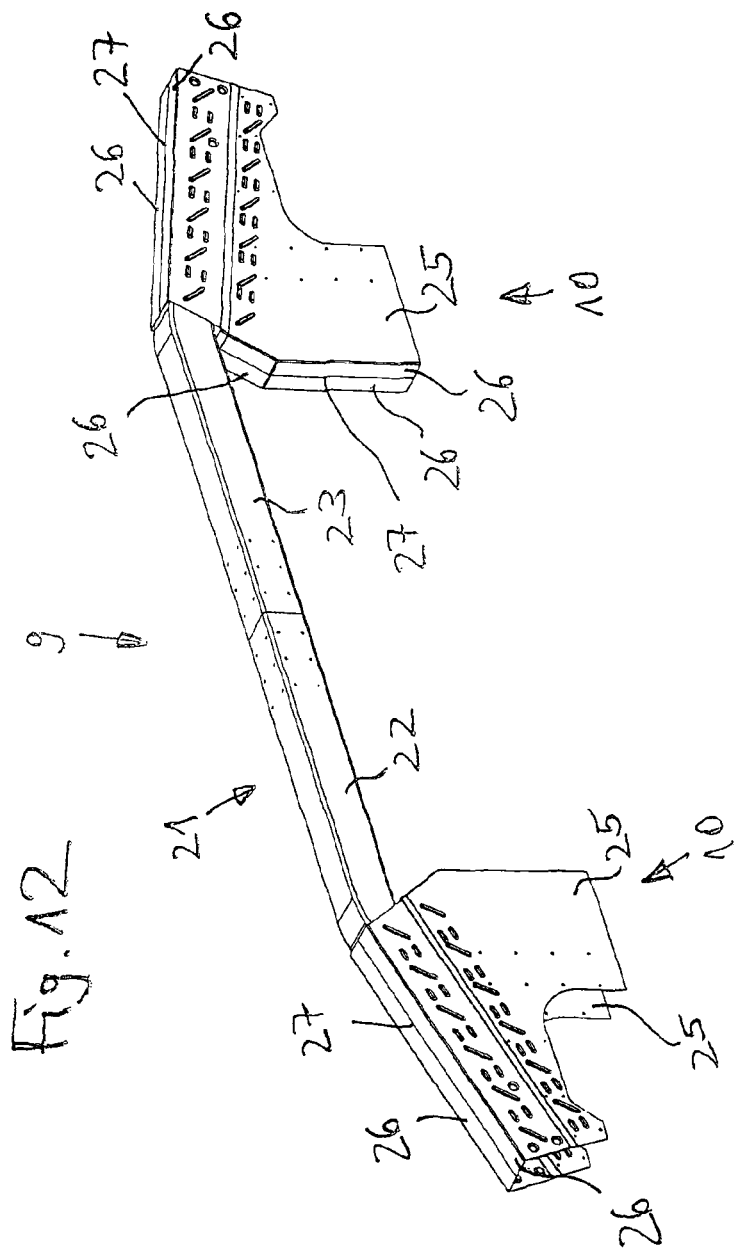
Figure 13:
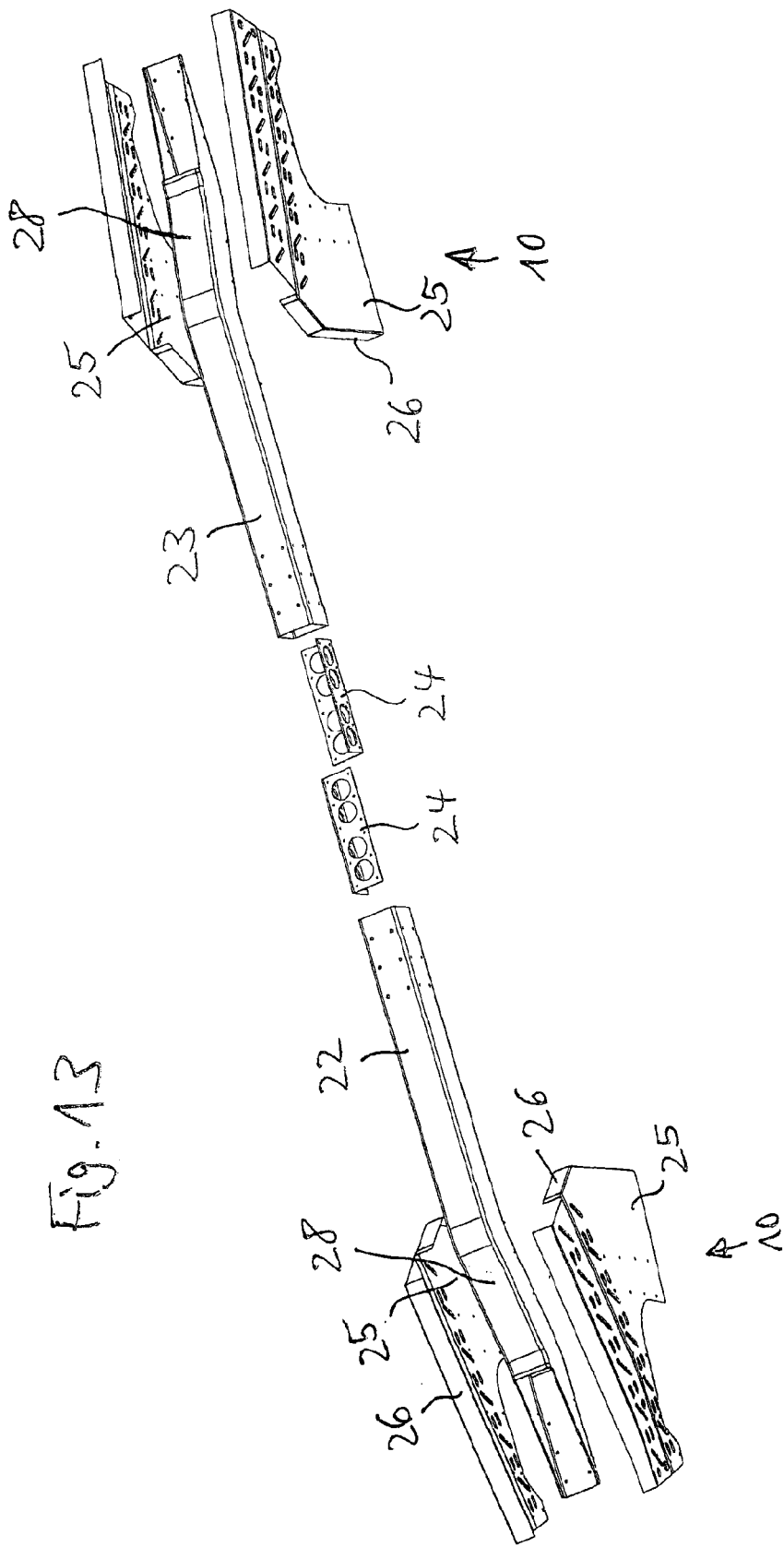

FIG. 8, the components of the central portion according to FIG. 7 in perspective views, FIG. 9, a first variant of the central portion according to FIGS. 7 and 8 in a view from the front and in a section along the line A-A of this view, FIG. 10, a second variant of the central portion according to FIGS. 7 and 8 in a view from the front and in a section along the line A-A of this view, FIG. 11, a third variant of the central portion according to FIGS. 7 and 8 in a view from the front and in a section along the line A-A of this view, FIG. 12, a second embodiment of a central portion of a rear wall of a harvesting attachment in the assembled state in a perspective view, FIG. 13, the components of the central portion according to FIG. 12 in perspective views, FIG. 14, the central portion according to FIGS. 12 and 13 in a view from the front and in a section along the line A-A of this view, FIG. 15, a part of the central portion according to FIGS. 12 to 14 prior to assembly in a perspective view, FIG. 16, the part of the central portion according to FIG. 15 after to assembly in a perspective view, FIG. 17, the outer portions of the rear wall and the bottom wall of a harvesting attachment in a perspective representation from above the front, FIG. 18, the subject matter of FIG. 17 in a perspective view from the rear down, FIG. 19, an outer portion of an extrusion profile rear wall in a cross section and FIG. 20, a prior art outer portion of an extrusion profile rear wall in a cross section.

Figure 2:
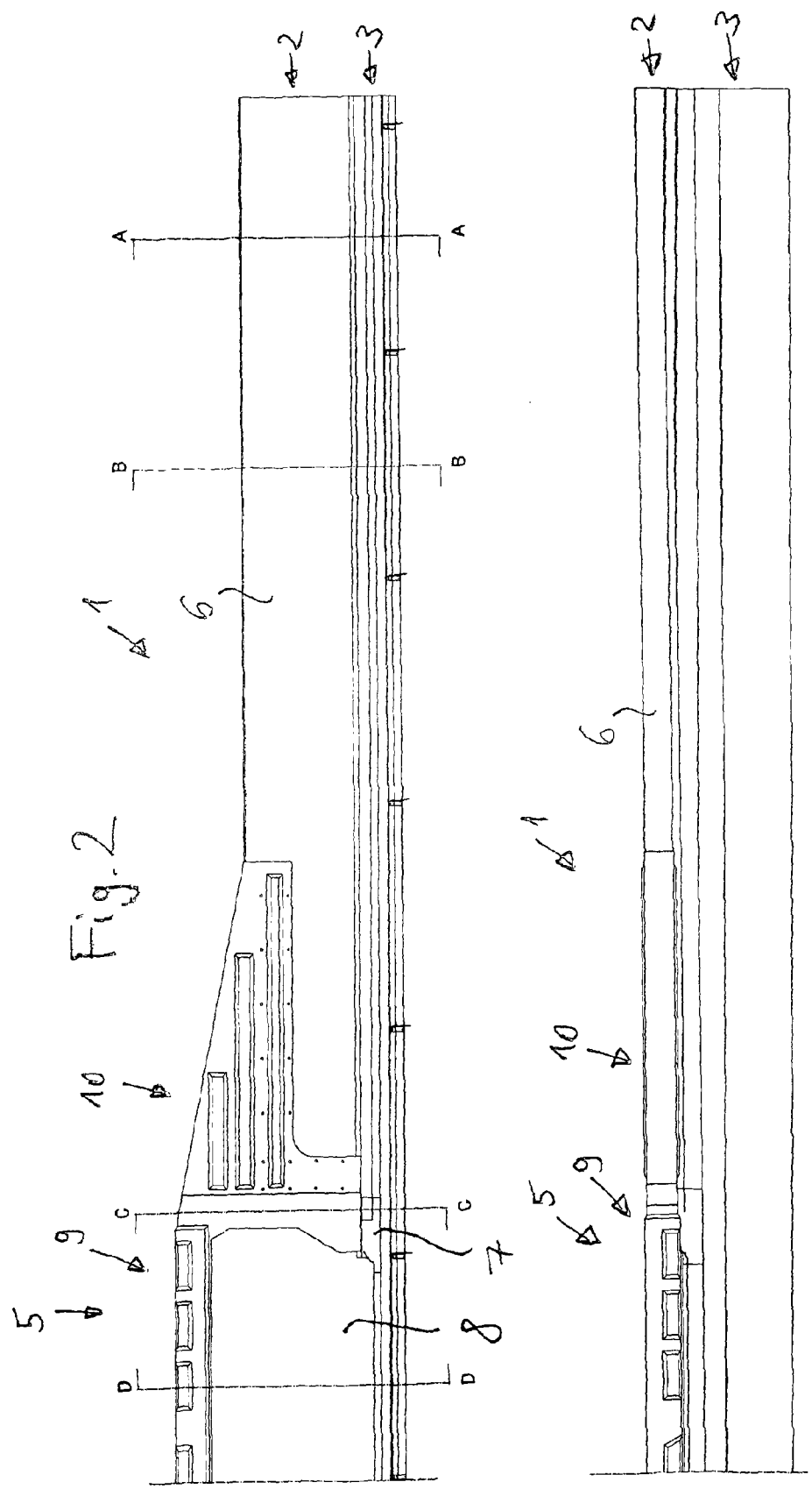

The harvesting attachment as shown in FIG. 1, for a harvester, in particular for a combine harvester, is particularly suited for the processing of grain. It has a frame 1, which comprises a rear wall 2 and a bottom wall 3. The frame 1 has an L-shaped angular form. The rear wall 2 extends substantially in the vertical direction and the bottom wall 3 extends substantially in the horizontal direction. The longitudinal extent of the frame 1 corresponds to the working width. The frame 1 has side walls at its ends (not shown in the drawing).

The rear wall 2 comprises a central portion 5 and two outer portions 6. The central portion 5 of the rear wall 2 is made of a high-tensile material, namely steel. The outer portions 6 and the bottom wall 3 are formed as an extrusion profile. It is a light metal extrusion profile made of aluminum or a material that contains aluminum. The central portion 5, the outer portions 6 and the bottom wall 3 are connected to one another.

In the center of the rear wall 2 a passage opening 8 is furthermore provided that is delimited by the central portion 5 and the bottom wall 3. The passage opening 8 can serve to mount the frame 1 to the harvesting vehicle. The crop can further be conveyed through the passage opening 8 from the front side of the frame 1 to the harvesting vehicle. An auger (not shown in the drawing) can be provided in the frame 1 to convey the crop.

The central portion 5 comprises a top part 9 and two side parts 10. The top part 9 is connected to each side part 10. The top part 9 extends substantially horizontally. Each side part 10 is located between the top part 9 on the one hand, and the outer portion 6 and the bottom wall 3 on the other hand.

The central portion 5 furthermore comprises lower parts 7 that are each connected to one outer portion 6. The lower parts 7 are furthermore connected to the bottom wall 3.

Figure 4:
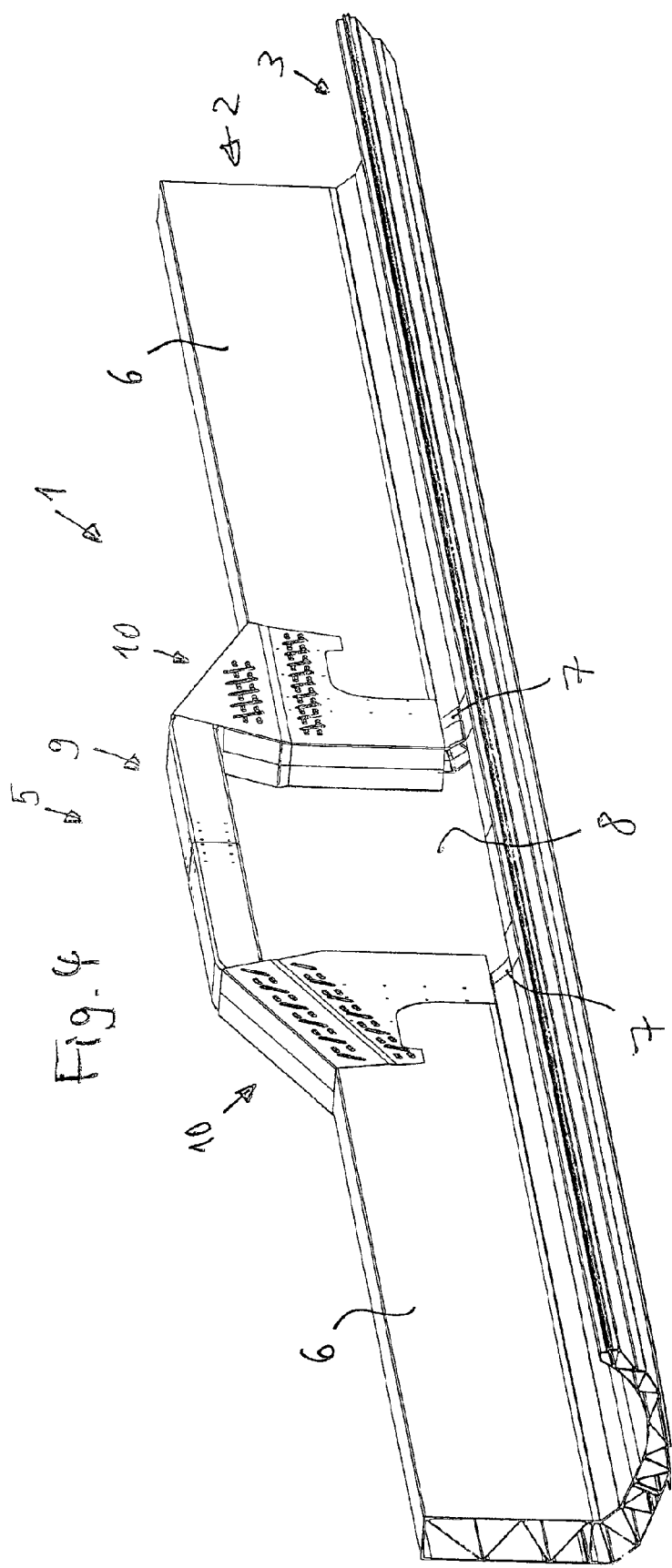
Figure 5:
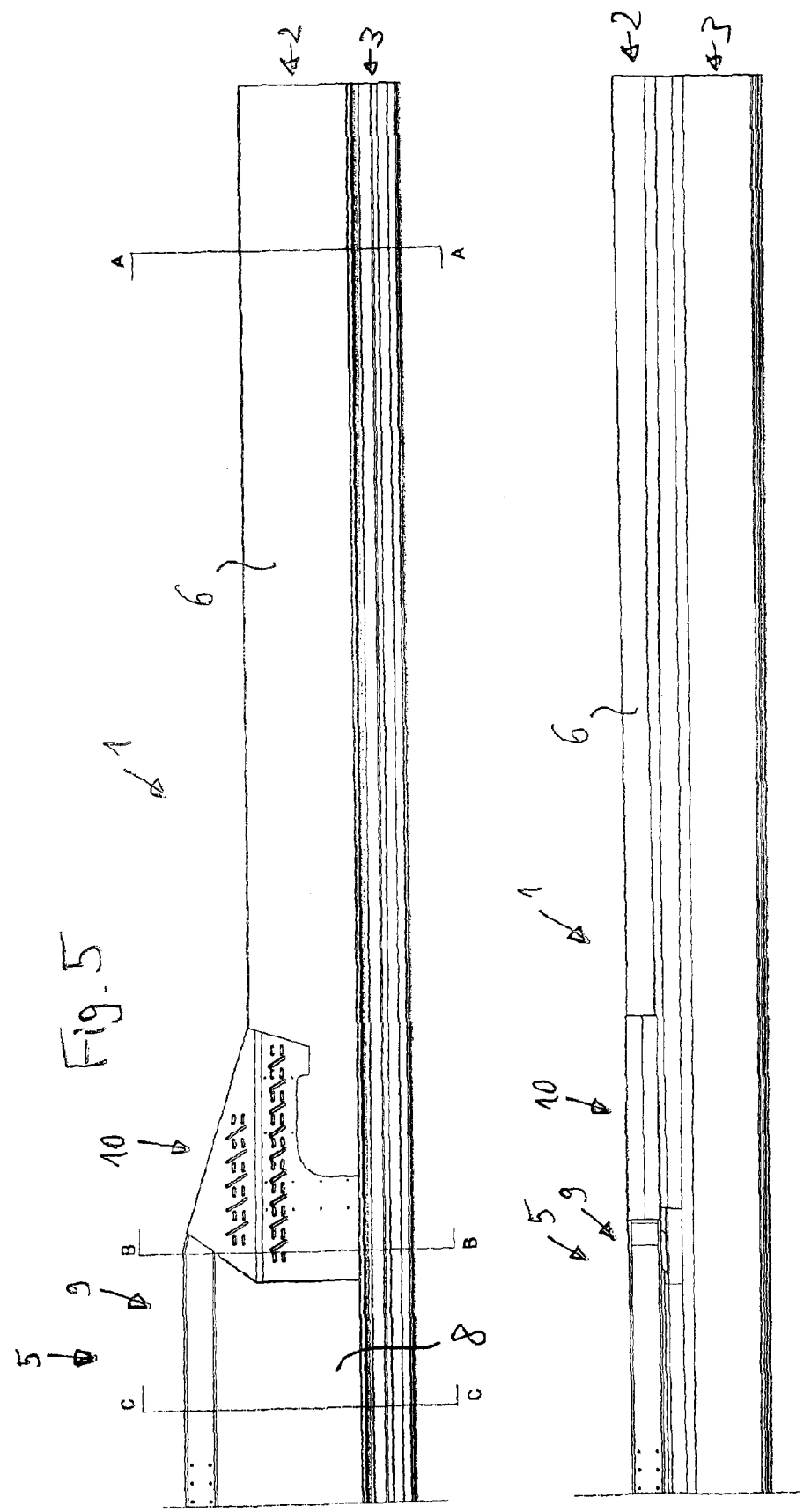
Figure 6:
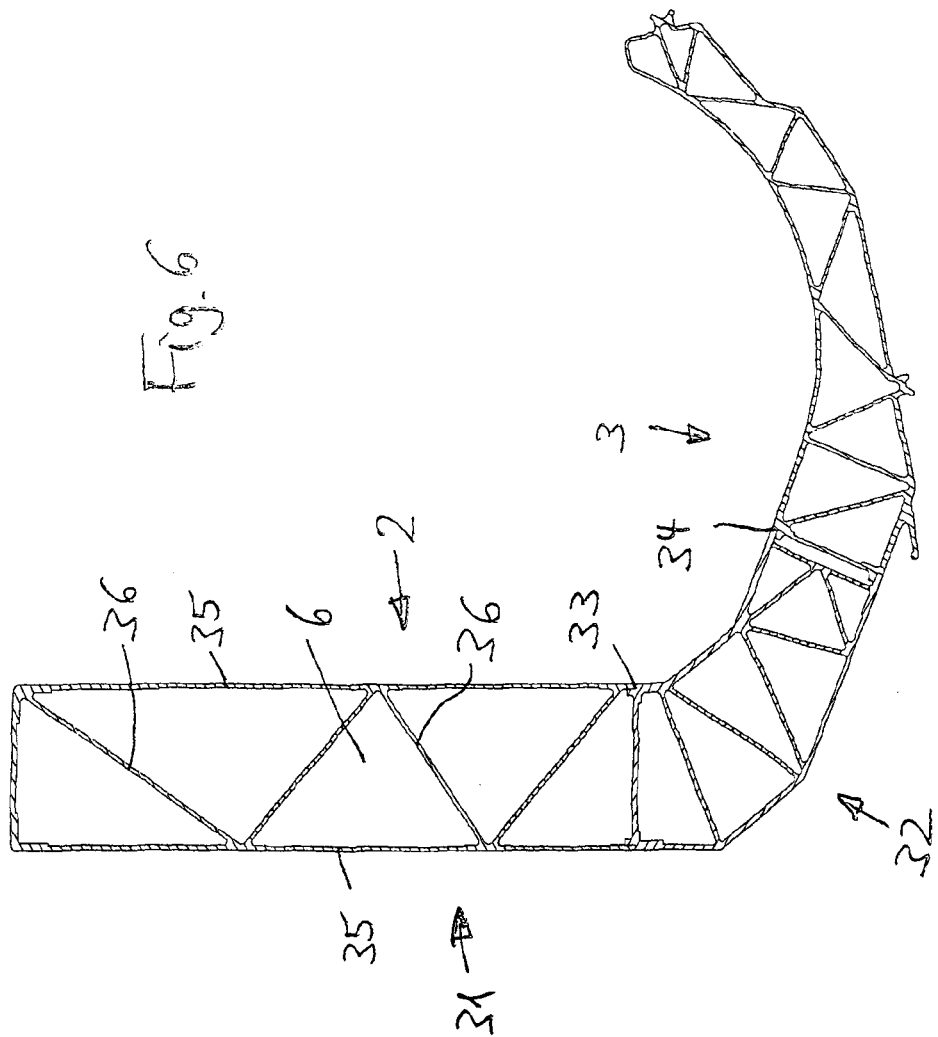

FIGS. 4 to 6 show another embodiment of a frame 1, wherein corresponding components are provided with the same reference symbols and are not described anew. The harvesting attachment according to FIGS. 4 to 6 is particularly suitable for the processing of corn.

FIGS. 7 to 11 show a first embodiment of a central portion 5 of a rear wall of a harvesting attachment. The top part 9 is formed as a hydroformed component with a horizontal part 11 and two downwardly pointing extensions 12. The side parts 10 are formed as bent and stamped components. The lower parts 7 likewise are formed as bent and stamped components. They can, however, also be formed as cast components, which can be particularly advantageous for serial production.

The downwardly pointing extensions 12 of the top part 9 are welded each to a side part 10 and each to an outer portion 6. Each extension comprises two downwardly pointing side parts 14.

Each side part 10 is U-shaped. Its base surface 15 is inclined. It slopes upward toward the top part 9. The side surfaces 16 extend downwards from the base wall surface 15. The side surfaces 14 of the extension 12 and the side surfaces 16 of the side parts 10 overlap one another. In this case, the side surfaces 16 of the side part 10 are located on the outside and the side surfaces 14 of the extension 12 are located on the inside.

The section view of FIG. 9 shows a first variant of the connection. In this case the outer side of the side surface 14 of the extension 12 is welded to the inner side of the side surface 16 of the side part 10 via a weld 17. The weld 17 is located in the area of the end 19 of the outer portion 6. The side surface 14 abuts against the outer side of the outer portion 6. At the end of the weld 17 the side surface 16 of the side part 10 is cranked toward the outside.

FIG. 10 shows a second variant of the connection. In this case the inner side of the side surface 14 of the extension 12 abuts against the outer side of the outer portion 6. The inner side of the side surface 16 of the side part 10 likewise abuts against the outer side of the outer portion 6. The side surface 14 extends over the end 19 of the outer portion 6. The end of the side surface 14 comes into abutment with the beginning of the side surface 16. The end of the side surface 14 and the beginning of the side surface 16 are connected to one another via a vee weld 20. The side surface 16 is cranked toward the outside.

FIG. 11 shows a third variant of the connection. In this case the vee weld 20', which connects the side surface 14 to the side surface 16, is located outside the area of outer portion 6.

FIGS. 12 to 16 show a second embodiment of a central portion 5 of a rear wall of a harvesting attachment, wherein the components that match those of the first embodiment are provided with the same reference numbers and are not described anew. In this case the top part 9 is formed as a bent square tube 21. The side parts 10 are formed as bent and stamped components.

The bent square tube 21 comprises a first part 22 and a second part 23, which are connected to one another by means of angle parts 24. The angle parts 24 are formed as L profiles. Said angle parts abut against the inner walls of the parts 22, 23 of the square tube 21 and are bolted to these parts 22, 23.

The side parts 10 each comprise two side plates 25 that are welded together. Each side plate 25 has flaps 26 that extend at a right angle to the main surface of the side plate 25. The flaps 26 of the side plates 25 of a side part 10 are in abutment with one another. They are welded to one another along the edges along which they are in abutment. The welds 27 can be formed as vee welds.

The side plates 25 are bolted together with the top part 9 and, each, with one outer portion 6. During assembly the side plates 25 are initially bolted together with the top part 9 and the outer portions 6, and are then welded to one another.

The square tube 21 has angulations 28 that preferably extend at an angle from 0° to 30° relative to the horizontal. The ends of the angulations 28 are connected, namely bolted together, with the upper end surfaces of the outer portions 6.

The flaps 26 of the side plates 25, which are connected by means of a weld 27 at their trailing edges, completely cover the inner end surface of the outer portion 6, so that the aluminum profile of the outer portions is protected against surface damage and risk of corrosion.

The side parts 25 are bolted to the outer portions 6.

The bottom wall 3 and the outer portions 6 are connected in the area of their inner lower ends to a corner reinforcement 29, as is clear from FIGS. 17 and 18. The corner reinforcement 29 is formed as a corner reinforcement profile. Said corner reinforcement is connected to the bottom wall 3 and one outer portion 6 by means of a weld 30.

The outer portions 6 are formed as a light metal extrusion profile, as is clear from FIGS. 17 to 20, as well as from FIGS. 3 and 6. Each outer portion 6 comprises a rear wall 31 and a curved connection wall 32. The rear wall 31 is connected to the curved connection wall 32 by means of a weld 33. The curved connection wall 32 is connected to the bottom wall 3 by means of a weld 34. The rear wall 32 and the bottom wall 3 are connected with each other by means of the curved connection wall 32.

The rear wall 31 comprises two outer walls 35 that extend parallel and at a distance to one another. Said outer walls are connected to one another by means of bracing walls 36 that extend oblique to the outer walls 35. In contrast to the state of the art embodiment according to DE 10 2010 052 816 A1, which is shown in FIG. 20, no bracing walls that run perpendicular to the outer walls 35 are present in the embodiment according to FIG. 19.

The bracing walls 36 form a zigzag line.

All of the welds can be formed as laser welds.

The invention claimed is:

1. A harvesting attachment for a harvester comprising a frame comprising a rear wall and a bottom wall fixed to the rear wall, the rear wall comprising a central portion and two outer portions fixed to and supported by the central portion, wherein the central portion of the rear wall is made of a high-tensile strength material, and wherein the two outer portions are made of a lighter weight lower tensile strength material.

2. The harvesting attachment of claim 1, wherein the central portion of the rear wall is made of steel.

3. The harvesting attachment of claim 1, wherein the outer portions of the rear wall and the bottom wall are formed as one of an extrusion profile, aluminum, and a material that contains aluminum.

4. The harvesting attachment of claim 1, wherein the central portion comprises a top part and two side parts that are connected to one another.

5. The harvesting attachment of claim 1, wherein the central portion comprises two lower parts that are each connected to one outer portion.

6. The harvesting attachment of claim 4, wherein the top part or the side parts or the lower parts are one of welded and bolted together.

7. The harvesting attachment of claim 5, wherein the top part is formed as a hydroformed component and in that the side parts are formed as bent and stamped components.

8. The harvesting attachment of claim 6, wherein the lower parts are formed as one of bent and stamped components and cast components.

9. The harvesting attachment of claim 7, wherein the top part has downwardly pointing extensions that are welded to the side parts.

10. The harvesting attachment of claim 5, wherein the top part is formed as a bent tube and in that the side parts are formed as bent and stamped components.

11. The harvesting attachment of claim 1, wherein the top part comprises two parts, that are connected to one another via angle parts.

12. The harvesting attachment of claim 4, wherein the side parts each comprise two side plates that are welded together.

13. The harvesting attachment of claim 4, wherein the side parts are bolted together with the outer portions.

14. The harvesting attachment of claim 1, wherein the bottom wall and the outer portions are connected, in the area of their inner lower ends, via a corner reinforcement or via a corner reinforcement profile.

15. The harvesting attachment of claim 1, wherein the outer portions have an extrusion profile rear wall having outer walls that are connected to one another via bracing walls that extend obliquely to the outer walls and no bracing walls that run perpendicularly to the outer walls.

16. A harvesting attachment for a harvester, the harvesting attachment comprising a rear wall and a bottom wall fixed to the rear wall, the rear wall comprising a central portion and two outer portions fixed to and supported by the central portion, wherein the central portion of the rear wall is made of a high-tensile strength material, and wherein the two outer portions of the rear wall are made of a lighter weight lower tensile strength material.

17. The harvesting attachment of claim 16, wherein the central portion comprises a top part and two side parts that are connected to one another.

18. The harvesting attachment of claim 16, wherein the central portion comprises two lower parts that are each connected to one outer portion.

19. The harvesting attachment of claim 16, wherein the bottom wall and the outer portions are connected, in the area of their inner lower ends, via a corner reinforcement or via a corner reinforcement profile.

20. The harvesting attachment of claim 16, wherein the outer portions have an extrusion profile rear wall having outer walls that are connected to one another via bracing walls that extend obliquely to the outer walls.

* * * * *